April 28, 1964 J. J. SMITH 3,130,951
RETRACTABLE STEEL WEDGE STOPPER
Filed Sept. 5, 1961 2 Sheets-Sheet 2
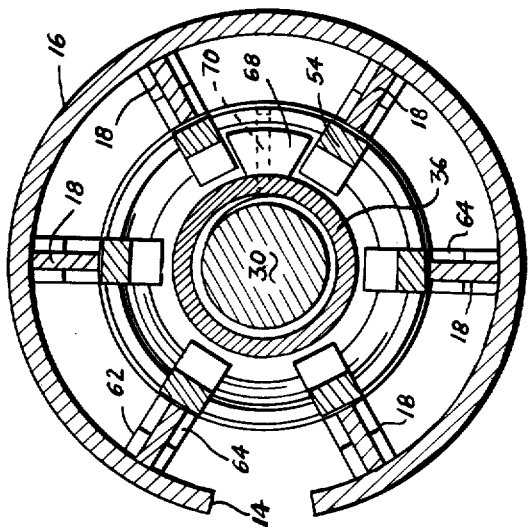
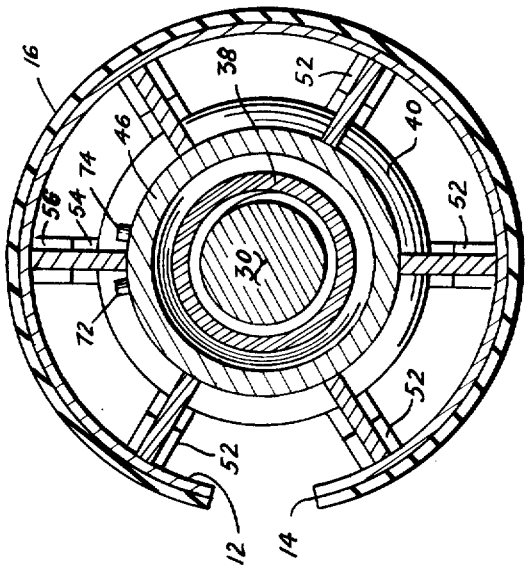
INVENTOR
John J. Smith
BY Cushman, Darby & Cushman
ATTORNEY

United States Patent Office 3,130,951
Patented Apr. 28, 1964

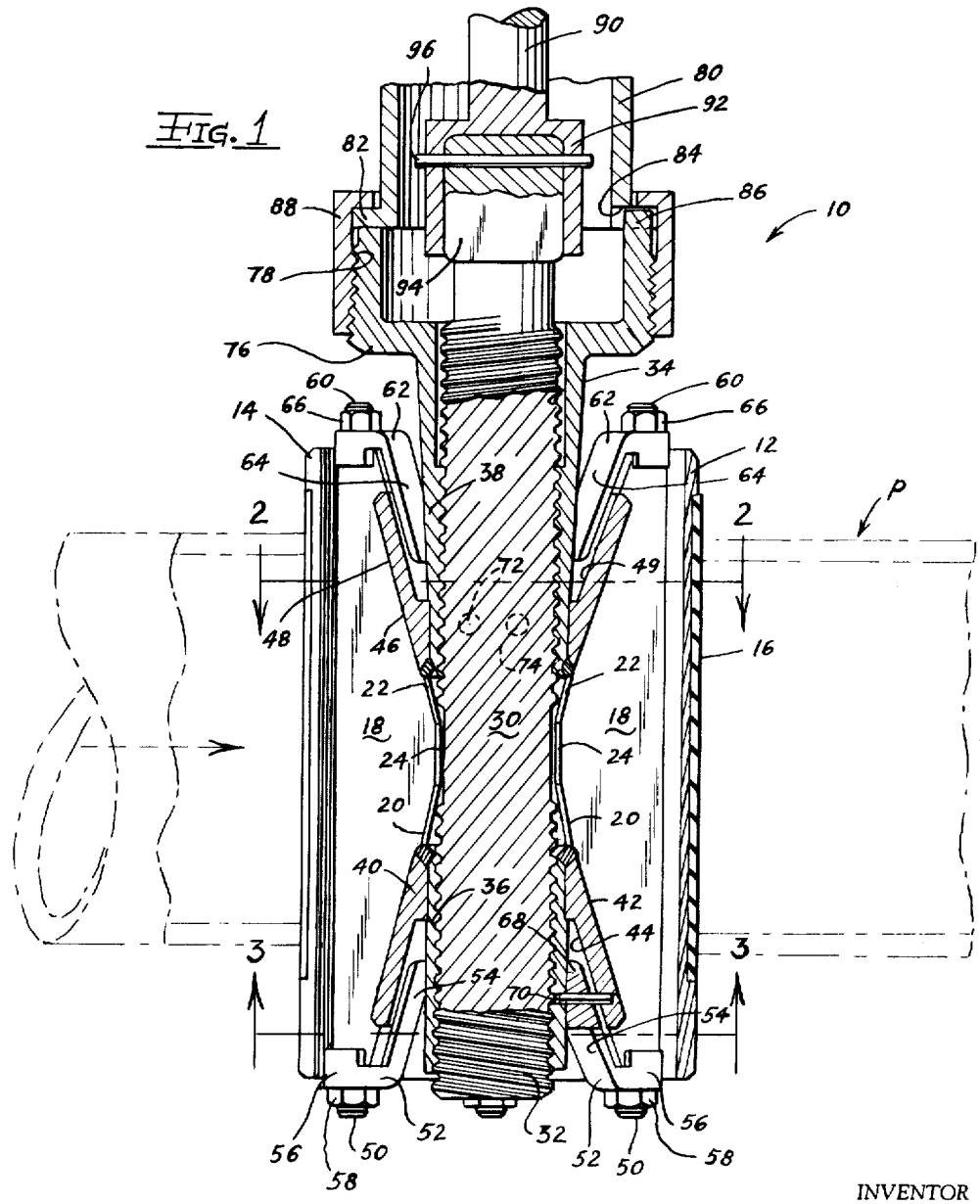

3,130,951
RETRACTABLE STEEL WEDGE STOPPER
John J. Smith, Decatur, Ill., assignor to Mueller Co., Decatur, Ill., a corporation of Illinois
Filed Sept. 5, 1961, Ser. No. 136,110
2 Claims. (Cl. 251—158)

This invention relates to pipe line stoppers of the expanding sleeve type adapted to be fitted in a transverse circular cut-out portion of a pipe, and radially expanded to stop the flow of fluid through the pipe. More particularly, this invention relates to improvements in expandable sleeve pipe stoppers of the type disclosed in the co-pending application of Wright et al., Serial No. 766,335, filed August 9, 1958 now Patent No. 3,049,333, granted August 14, 1962.

Prior art pipe stoppers of this general character comprise a longitudinally split, flexible cylindrical metal sleeve of rather springy material such as sheet metal or the like, provided with an exterior covering of rubber or equivalent sealing material so as to effectively seal the edges of the cut-out portion of the pipe. Such prior art stoppers are provided with inner wedging means for positively expanding the sleeve into sealing relationship with the edges of the cut-out portion of the pipe.

In the co-pending application of Wright et al., Serial No. 766,335, there is disclosed an expandable stopper of the character described, which is operative to positively contract as well as to positively expand the stopper. While the invention described therein has enjoyed a considerable degree of success, the assembly of this disclosed pipe stopper is rendered difficult in view of the fact that the opposed frusto-conical nut means are carried within the split sleeve with their base ends adjacent one another so that the wedge fingers carried by the sleeve interior confine the frusto-conical nut means within the assembly. Necessarily, assembly of the nut means within the sleeve is a difficult and time-consuming task in view of the fact that either they must be so positioned prior to the assembly of the wedge fingers to the interior of the split sleeve, or the latter expanded manually or by a special tool to enable the expander means to be positioned therein.

It is accordingly an object of this invention to provide a pipe line stopper which includes means operative to positively contract as well as to positively expand the stopper, constructed and arranged to provide a notably superior assembly thereof, thus obviating the above described shortcomings of the prior art.

This invention contemplates the provision of a split sleeve carrying a plurality of longitudinal vanes along the interior of the sleeve, each vane having oppositely inclined end wedging surfaces. Opposed expander means having exterior and interior wedging surfaces are threadably carried by a centrally disposed jack screw having two sets of threads of opposite direction, the opposed expander means engaging along their exterior wedging surfaces with the inner inclined edges of the vanes in order to expand the sleeve. The cylindrical sleeve detachably carries at its ends oppositely inclined wedging fingers which engage the interior wedging surfaces of the expander means in order to contract the sleeves.

The small ends of the expander means are adjacent each other, so that the split sleeve is thereby expanded by movement of the expander means toward one another positively contracted by moving the expander means away from one another. By virtue of this arrangement, assembly of the pipe line stopper is greatly simplified, as there are no movable frusto-conical or wedge members having base portions adjacent one another, but rather all such members diverge outwardly towards the opposed ends of the stopper.

Still a further object of this invention is the provision of a pipe line stopper of the character described which includes new and improved means for preventing relative rotational movement between the split sleeve and its orienting support during expansion and contraction of the sleeve.

These and still further objects, advantages, and novel features of the present invention will become apparent in the specification and claims taken in connection with the accompanying drawings.

FIGURE 1 is a longitudinal view generally in section, showing the pipe line stopper according to the present invention; and FIGURES 2 and 3 are sectional views taken along lines 2—2 and 3—3 respectively in FIGURE 1.

Reference is now made to the drawings wherein there is shown a pipe line stopper 10 positioned within a cut-out portion of a pipe P shown in phantom lines. The particular construction of the pipe at this cut-out portion is well-known in the art and forms no part of the present invention. In this regard, see, e.g. the patent to Koenig, No. 2,274,606 and Smith Patent No. 2,655,339.

The pipe line stopper 10 includes a cylindrical sleeve 12 having a longitudinal slot 14, the sleeve 12 being constructed of a somewhat springy material such as sheet metal. Joined to the outer surface of the sleeve 12 is a flexible covering 16 of rubber or other suitable sealing material adapted for engagement with the edges of the cut-out portion of the pipe P to provide a sufficient seal therewith.

Secured to the interior of the sleeve 12 are a plurality of circumferentially spaced, inwardly extending vanes 18. These vanes 18 are of somewhat triangular configuration having opposite, inwardly converging inner edges 20 and 22, terminating at their innermost extremities at a flat, longitudinal edge 24.

Positioned along the axis of the sleeve 12 is a jack screw 30 having two sets of threads 32 and 34 of opposite direction. Threadably joined to the lower threaded end 32 of the jack screw 30 is a lower collar 36; and, threadably joined to the upper threaded end 34 of the jack screw 30 is an upper collar 38.

Joined, as by welding, to the lower collar 36 is an expander wedge 40 having a frusto-conical exterior surface 42 opposed to, and having the same angle of inclination as, the edges 20 of the vanes 18. The expander wedge 40 also has an interior frusto-conical surface 44 generally parallel to the exterior surface 42. Likewise, the collar 38 carries an identical, oppositely positioned frusto-conical wedge 46 having an exterior surface 48 opposed to the edges 22 of the vanes 18.

Joined, as by welding, to the bottom ends of the vanes 18 are threaded studs 50. These studs 50 carry wedging fingers 52 having portions 54 which project within the wedge 40 and converge toward one another at the same angle as the interior surface 44 of the expander wedge 40. The base portions 56 of the fingers 52 are notched or slotted to fit snugly over the ends of their respective vanes in order to prevent any turning movement on the studs 50. Nuts 58 are secured to the fingers 52 or the studs 50.

In a like manner, the upper ends of the vanes 18 carry threaded studs 60, which, in turn, carry wedging fingers 62 having converging portions 64 which project within and are inclined at the same angle as the interior surface 49 of the expander wedge 46. The fingers 62 are also fixedly secured to the threaded studs 58 by nuts 66.

Consistent with general practice, the pipe line stopper 10 is inserted into the pipe P with the slot 14 disposed upstream, and expansion and contraction of the sleeve 12 is necessarily accomplished without undesirable rotation thereof.

In order to ensure that the sleeve 12 is non-rotatably expanded and contracted, means are provided to prevent relative rotational movement of the split sleeve (and vanes 18) with respect to the expander wedges 40 and 46. To this end, a wedge-shaped locking member 68 (FIGURES 1 and 3) is fitted snugly between adjacent fingers 52 and between the interior surface 44 of the expander wedge 40 and the collar 36. The locking member 68 is retained in this position, and so prevents relative rotational movement between the sleeve 12 and wedge 40, by a pin 70 passing through the expander wedge 40, the locking wedge 68, and the collar 36. For a similar purpose, the expander wedge 46 carries radially extending, spaced apart pins 72 and 74 positioned adjacent each side of a vane 18 (FIGURE 2) so that the expander wedge 46 and the collar 38 cannot rotate relative to the vanes 18 and the sleeve 12.

The upper collar 38 has an enlarged cup-shaped upper end 76 having exterior threads 78. An orienting and manipulating tube 80 having a lower flanged end 82 is non-rotatably engaged to the cup end 76 of the collar 38 by an interfitting slot 84 and tongue 86, in the flange 82, and extending from the tube end 76, respectively, thereby preventing relative rotational movement between the orienting tube 80 and the collar 38. A coupling nut 88 is threaded onto the exterior threads 78 of the collar upper end 76 and engages the flange 82 on the tube 80, thereby tightly joining these elements together. An operating rod 90 having a lower recessed end portion 92 receives the upper end 94 of the jack screw 30, these elements being non-rotatably secured by a retaining pin 96 passing therethrough.

In operation, the stopper 10 is inserted into the cut-out portion of the pipe P by the orienting tube 80 and rotated as necessary to position the slot 14 on the upstream side.

The sleeve 12 is then expanded by rotating the operating rod 90 to move the expander wedges 40 and 46 toward one another along the jack screw 30, thereby engaging their respective exterior surfaces 42 and 48 with the respective edges 20 and 22 of the vanes 18. The sleeve 12 is thus expanded uniformly so that the covering 16 seals tightly against the edges of the cut-out opening through the pipe P.

When it is desired to remove the stopper 10 from the pipe P, the operating rod 90 is rotated in the opposite direction, thereby operatively moving the expander wedges 40 and 46 outwardly away from each other. Positive mechanical contraction of the sleeve 12 is then provided by engagement of the interior outwardly moving surfaces 44 and 49 with the opposed surfaces of the clamping bars 52 and 62 respectively.

The notable significance of this invention is the ease and simplicity of assembling the stopper 10. Thus, the collar 38 together with its wedge 46 is simply threaded onto the jack screw 30. The sleeve 12 is then positioned over the screw 30 and wedge 46 so that the pins 72 and 74 straddle a vane 18. The collar 36 and wedge 40 are then threaded onto the screw 30 and the locking member 68 positioned between the expander wedge 40 and the collar 36 and fixed therebetween by simply inserting the pin 70 therein (FIGURES 1 and 3). The fingers 52 and 62 are then assembled onto the studs 50 and 60 and secured thereon by the nuts 58 and 66. Thus, there is no adverse initial stress on the spring material which constitutes the cylindrical sleeve 12 as is the case with the prior art.

From the foregoing description of this invention, it is evident that the objects of this invention, together with many practical advantages, are successfully achieved. While the preferred embodiment of my invention has been described, numerous substantial mechanical modifications may be made without departing from the spirit and scope of this invention.

Therefore, it is to be understood that all matters herein set forth or shown in the accompanying drawings are to be interpreted in an illustrative and not in a limiting sense.

What is claimed is:

1. A cylindrical pipe stopper assembly for insertion into, and having a minimum outer diameter less than, a transverse circular opening through a pipe line, and adapted to be expanded into sealing engagement with the edges of the opening comprising: an expandable and contractable longitudinally-split cylindrical sleeve; a plurality of vanes spaced circumferentially about and secured to the inner side of said sleeve, said vanes having opposite converging inner end surfaces; a jack screw disposed coaxially within said sleeve and having two sets of threads of opposite direction; a pair of expander wedge means threadably engaged with said jack screw thread sets and selectively movable toward and away from each other upon rotation of said jack screw, each of said expander wedge means having generally frusto-conical exterior and surfaces, said exterior surfaces being positioned to effect sleeve-expanding wedging engagement with said converging edges of said vanes on movement of said wedge means toward each other; and wedging fingers detachably secured to the opposite ends of said vanes and extending into each of said wedge means to effect sleeve-contracting wedging engagement with said interior surfaces on movement of said expander wedge means away from each other; means for preventing relative rotation between said wedge means and said sleeve; means on one end of said assembly for securing thereto a manipulating tube for rotating and moving said assembly axially; and means on one end of said jack screw for securing thereto an operating extension to extend coaxially through said manipulating tube, whereby said sleeve can be positively expanded and contracted independently of axial movements thereof.

2. A pipe line stopper assembly as defined in claim 1 in which the relative-rotation-preventing means includes a locking member detachably secured to one of said expander wedge means and fitting snugly between two adjacent corresponding fingers to prevent relative rotation between said one wedge means and the sleeve.

References Cited in the file of this patent

UNITED STATES PATENTS

| | | |
|---|---|---|
| 1,624,465 | Black | Apr. 12, 1927 |
| 2,655,339 | Smith | Oct. 13, 1953 |